H. PETERSEN.
SECTIONAL PISTON FOR ENGINES.
APPLICATION FILED JULY 22, 1921.
1,428,656.
Patented Sept. 12, 1922.
2 SHEETS—SHEET 1.
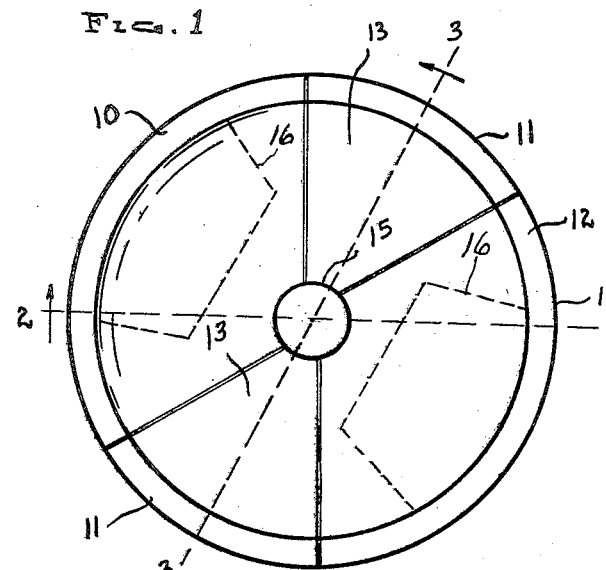
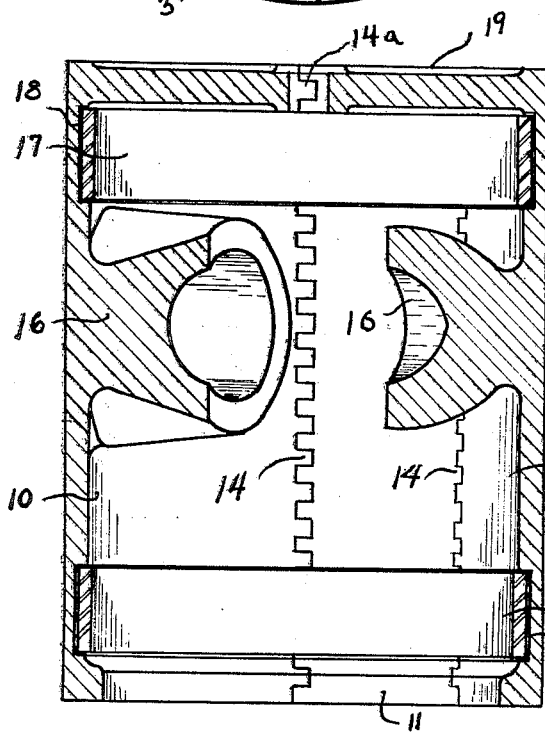
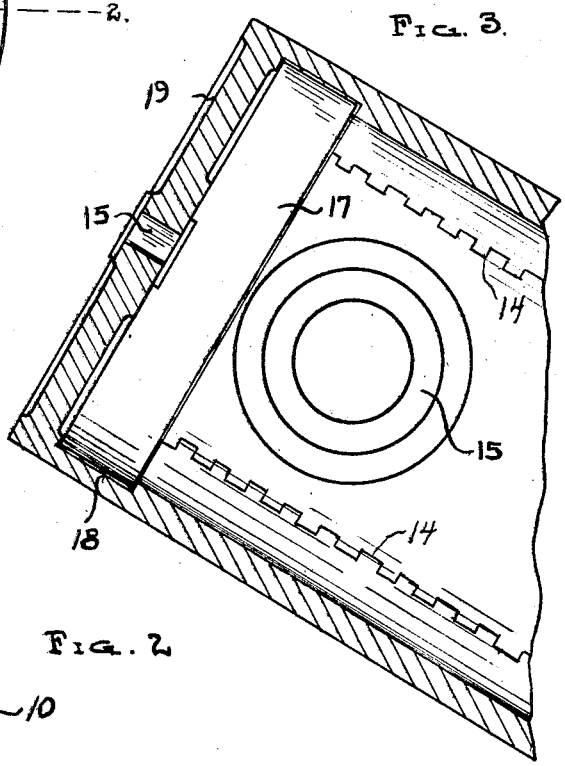
INVENTOR.
Hans Petersen,
BY Walter N. Haskell.
his ATTORNEY.

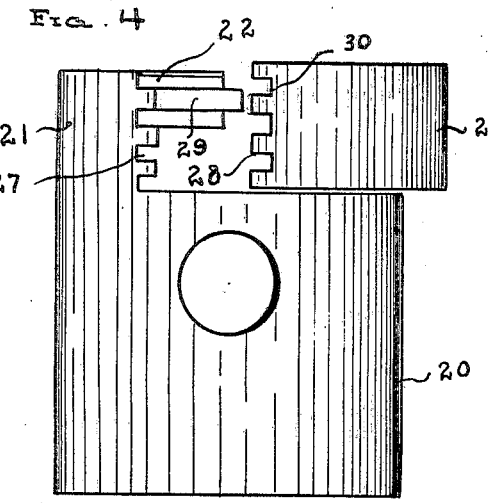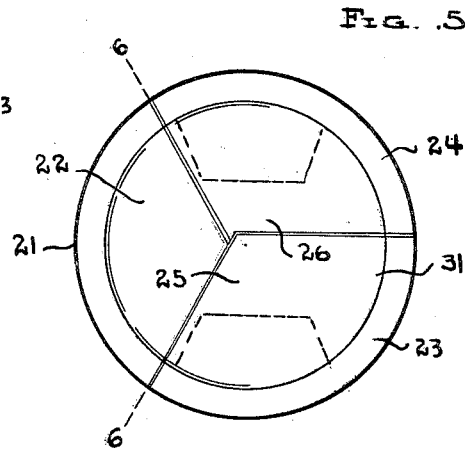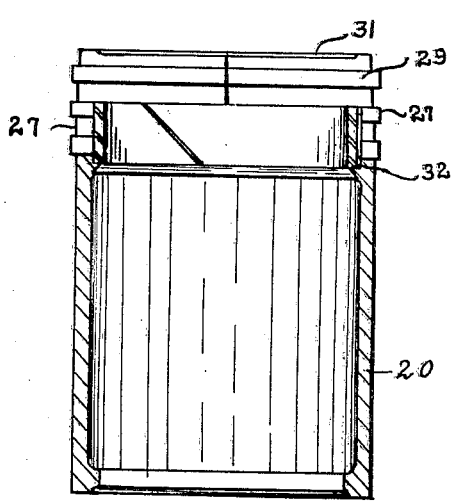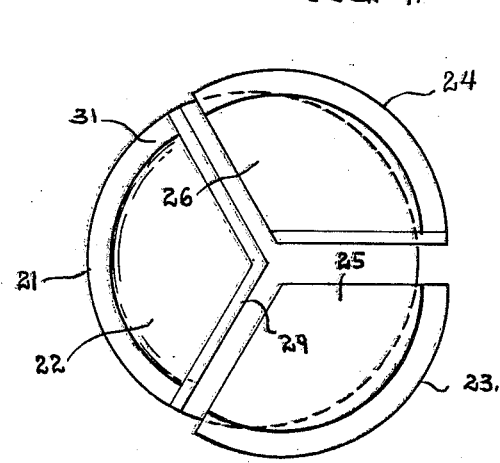

Patented Sept. 12, 1922.

1,428,656

UNITED STATES PATENT OFFICE.

HANS PETERSEN, OF DAVENPORT, IOWA.

SECTIONAL PISTON FOR ENGINES.

Application filed July 22, 1921. Serial No. 486,662.

*To all whom it may concern:*

Be it known that I, HANS PETERSEN, a citizen of the United States, residing at Davenport, in the county of Scott and State of Iowa, have invented certain new and useful Improvements in Sectional Pistons for Engines, of which the following is a specification.

My invention has reference to sectional pistons, and is more specially designed for use in the cylinders of internal combustion engines. It is not limited to such use, however, but may be readily adapted for operation in engines employing steam or other pressure elements.

The chief purpose of the invention is to provide a piston formed of two or more sections capable of expanding so that the walls thereof will be in close operating contact with the wall of the cylinder.

Another purpose of the device is to provide means for holding the parts of the piston in expanded position, when in operation.

Another purpose of the invention is to provide a piston which is complete throughout the greater part of its length, but which is fitted with expansible sections which will maintain the desired contact with the cylinder wall.

By the use of my invention the usual piston rings may be dispensed with, the accompanying danger of the same becoming broken, or inoperative from other cause, and the necessity of repairs thereto.

In the drawings:

Fig. 1 is an end view of the invention, looking at the head end thereof.

Fig. 2 is a longitudinal section on the line 2—2 of Fig. 1.

Fig. 3 is a similar view on the line 3—3 of Fig. 1.

Fig. 4 shows a modified form of the invention, in side elevation, with the segment 23 partly removed.

Fig. 5 is an end view thereof, with the parts assembled.

Fig. 6 is a section on the line 6—6, following the joint between the parts 22, 25, and 26.

Fig. 7 is an end view, similar to Fig. 5, with the segments 23 and 24 separated from the part 21.

Referring to the first three figures, which set forth the preferred embodiment of the invention, there is shown therein a cylindrical piston, formed of two segmental portions 10, and two segments 11 of comparatively smaller size. The parts 10 are provided at one end with head-segments 12, and the parts 11 with corresponding segments 13, completing the head of the piston. The adjacent edges of the parts 10 and 11 are provided with a dove-tail formation, as indicated at 14, and the edges of the parts 12 and 13 are also fitted with a tongue and groove formation, as shown at $14^a$. These parts are thereby permitted a limited amount of expansion in the cylinder in which they are operating. At a central point the segments 12 and 13 are provided with an opening in which is held a spool 15, the flanges of which overlap the faces of such segments and allow for a slight movement of such plates radially, without permitting the gases to penetrate the head of the cylinder at that point.

The sections 10 are provided on their inner faces with bearings 16 for the wrist-pin of the connecting rod, and at either end of the piston is an expansion ring 17, located in recesses 18 in the inner wall of the piston. By this means the sections of the piston are held normally in an expanded position. The head of the piston is also provided with a shallow depression 19, which receives the expansive force of the gases on the working stroke of the piston, and assists in holding the piston sections in operative engagement with the wall of the cylinder.

Figures 4 to 7, inclusive, of the drawings, illustrate another form of the invention, which comprises a cylindrical portion 20, having a sectional projection 21, provided with a head segment 22. Completing the head end of the cylinder are sections 23 and 24, fitted with head segments 25 and 26. The edges of the sections join by means of dove-tail cuts shown at 27 and 28, and the segments of the head are joined by alternating tongues and grooves, as indicated at 29 and 30, permitting a limited expansion of such parts, and at the same time preventing the penetration of the gases. The outer face of the head segments 22, 25, and 26 is also provided with a depression 31, similar to the depression 19 in the other form of the device. It will be evident that any increase in the pressure of the gases against the end of the piston will cause a correspondingly increased force to be exerted against the rim surrounding the depression, holding the piston sections more closely in contact with the cylinder wall.

The inner face of the head end of the piston is also provided with an expansion ring 32, exerting an outward force upon the movable sections. Only one ring is shown in this form of the device; and one of such rings would probably be sufficient in the other form also, used at the point nearest the head of the piston.

I do not wish to be understood as limiting myself to the particular construction and arrangement of the parts shown and set forth herein, as changes can be made therein without departing from the scope of the invention.

What I claim and desire to secure by Letters Patent, is:

1. A device of the class described, comprising a cylindrical body formed of two or more sections having interlocking edges, and a segmental head the edges of which are fitted with inter-engaging tongues and grooves.

2. A device of the class described, comprising a cylindrical body formed of sectional parts having interlocking edges; a segmental head at one end of said body, provided at its joints with inter-acting tongues and grooves; and means for holding said sectional parts normally in expanded position.

3. A device of the class described, comprising a cylindrical body portion formed of two or more sections having interlocking edges, and fitted with segmental pieces projected inwardly at one end thereof to form a head, provided in its outer face with a depression; and expansion devices on the interior of said cylindrical body, exerting an outward pressure upon the sections thereof.

4. A device of the class described, comprising a cylindrical body having a segmental head section; sectional end pieces completing the head of said cylindrical body, and fitted on their edges with inter-engaging tongues and grooves; and means for exerting an outward pressure on said sectional pieces, to cause an operative contact with the wall of the cylinder.

5. A device of the class described, comprising a plurality of segmental end-pieces, provided at their adjacent edges with inter-engaging tongues and grooves, and projected into cylindrical portions fitted at their edges with interlocking means; a cylindrical member integral with one of said segments; and means for holding said segments normally in an expanded position in an engine cylinder.

6. A device of the class described, comprising a cylindrical body formed of two or more sections having interlocking adjacent edges, and a segmental head the segments of which are integral with said sections, fitted at their joints with inter-acting tongues and grooves; and one or more expansion rings on the interior of said cylindrical body, exerting an outward pressure upon said sections.

7. A device of the class described, comprising a cylindrical body formed of two or more sections having interlocking adjacent edges, and a segmental head the edges of which are fitted with inter-engaging tongues and grooves; a spool centrally of said segments, the flanges of which overlap on the faces thereof; and means for holding said sections normally in expanded position in an engine cylinder.

In testimony whereof I affix my signature.

HANS PETERSEN.